United States Patent
Dieringer (10) Patent No.: US 7,062,301 B1
(45) Date of Patent: Jun. 13, 2006

(54) WIRELESS CONTROL OF OPERATING CHARACTERISTICS OF MICROPHONE-INCLUDING ARRANGEMENT FOR USERS OF POWER SPORTS EQUIPMENT

(76) Inventor: Michael D. Dieringer, 7 Buggy Whip Dr., Rolling Hills, CA (US) 90274

( * ) Notice: Subject to any disclaimer, the term of this patent is extended or adjusted under 35 U.S.C. 154(b) by 0 days.

(21) Appl. No.: 11/066,032

(22) Filed: Feb. 25, 2005

(51) Int. Cl.
 *H04M 1/00* (2006.01)
(52) U.S. Cl. .................... 455/569.1; 455/90.2; 455/345
(58) Field of Classification Search ............. 455/569.1, 455/90.2, 90.3, 345, 575.9
 See application file for complete search history.

(56) References Cited

U.S. PATENT DOCUMENTS

| | | | | |
|---|---|---|---|---|
| 5,790,947 A | | 8/1998 | Dieringer | |
| 6,015,160 A | * | 1/2000 | Spector | 280/288.4 |
| 6,311,052 B1 | * | 10/2001 | Lenz | 455/305 |
| 2003/0026440 A1 | * | 2/2003 | Lazzeroni et al. | 381/86 |
| 2004/0235429 A1 | * | 11/2004 | Garavaglia et al. | 455/90.1 |

* cited by examiner

*Primary Examiner*—Erika A. Gary
(74) *Attorney, Agent, or Firm*—Michael E. McKee (57) ABSTRACT

A communication system for use by a rider of power sports equipment having enables the rider to control the operating characteristics, such as the operating mode, of a microphone-including arrangement of a two-way radio or public address (PA) equipment while the rider maintains his grip about the handlebars of the power sports equipment for operation thereof. Furthermore, the communication system does not involve any connecting wires which may otherwise extend between any components of the system which are carried by the rider and any components of the system which are carried by the power sports equipment.

15 Claims, 4 Drawing Sheets

WIRELESS CONTROL OF OPERATING CHARACTERISTICS OF MICROPHONE-INCLUDING ARRANGEMENT FOR USERS OF POWER SPORTS EQUIPMENT

BACKGROUND OF THE INVENTION

This invention relates generally to means and methods for controlling various operating characteristics of a microphone-including arrangement for a radio system or a public address system by a user of either of such systems and relates, more particularly, to the means for controlling operating characteristics of such a microphone-including arrangement while the user operates power sports equipment, such as a motorcycle.

The class of radio and public address systems with which this invention is to be used includes those which are utilized by riders of power sports equipment, such as a motorcycle, in police, rescue or military environments. It is common, for example, that a motorcycle-riding policeman carries a portable (e.g. belt-mounted) two-way radio or has access to a two-way radio carried by the motorcycle for purposes of communicating with other police personnel. Similarly, in instances in which a public address (PA) system is mounted upon the power sports equipment, the rider may desire that messages spoken by him be broadcast over the loudspeaker of the PA system. For purposes of transmitting his voice messages over a radio or over a loudspeaker of a PA system, the rider typically utilizes a microphone-including arrangement which must commonly be switched between a talk mode (which enables voice messages from the rider to be transmitted from the microphone-including unit) and a non-talk mode.

Because safe operation of power sports equipment normally requires that both hands of the rider be positioned or gripped about a set of handlebars associated with the power sports equipment—wherein such operation may involve the steering, speed control and the braking of the power sports equipment, it is difficult for the rider of the power sports equipment to actuate switches carried upon his person (e.g. upon a belt-mounted radio) for switching the microphone-including unit between its talk mode and its non-talk (e.g. a listen) mode while he operates the power sports equipment.

In my earlier U.S. Pat. No. 5,790,947, I suggest that a motorcycle rider utilize a pair of handlebar-mounted switches which permit the rider to transmit his voice over a helmet-mounted microphone to either a radio or a PA system associated with the motorcycle while the rider maintains his grip about the handlebars of the motorcycle. In particular, upon depression (i.e. actuation) of one of the handlebar-mounted switches, the rider's voice messages are conducted from his helmet-mounted microphone to the radio, and upon depression of the other of the handlebar-mounted switches, the rider's voice messages are conducted from his helmet-mounted microphone to the loudspeaker of the PA system for broadcast therefrom. However, such a switching scheme has heretofore been limited in that the handlebar-mounted switches are hardwired to the helmet-mounted microphone for controlling the microphone operation by way of the handlebar-mounted switches. In other words, there has been at least one wire which joins the handlebar-mounted switches to the helmet-mounted microphone, and the rider's movement away from his motorcycle can be limited as a result. Such a connecting wire can be designed to be disconnected from the rider or his motorcycle with relative ease, but if the rider forgets to disconnect the wire and then walks away from the motorcycle, he will likely be yanked back toward the motorcycle by the connected wire or become entangled within the wire.

Accordingly, it is an object of the present invention to provide a new and improved system for use by a rider of power sports equipment, such as a motorcycle, who is expected to control the operating characteristics, such as may involve a switching between operating modes, of a microphone-including arrangement associated with a radio or a PA system while the power sports equipment is being operated or ridden and which obviates the need for a connecting wire between the power sports equipment and a microphone-including unit associated with a radio or a PA system.

Another object of the present invention is to provide such a system which enhances the ability of the rider to move away from his power sports equipment in that he does not need to disconnect himself from any connecting wire which might otherwise limit his movement away from the power sports equipment.

Still another object of the present invention is to provide such a system having a microphone-including arrangement which can be switched between a talk mode and a non-talk mode by way of wireless signals.

Yet another object of the present invention is to provide such a system which is particularly well-suited for use by a motorcycle-riding policeman whose motorcycle is equipped with a PA system and a two-way radio and who carries a portable two-way radio for communication with other police personnel.

A further object of the present invention is to provide such a system which is uncomplicated in structure, yet effective in operation.

SUMMARY OF THE INVENTION

This invention resides in an improvement to a communication system for use by a rider of power sports equipment having handlebars upon which the hands of the rider are positioned during operation of the power sports equipment and wherein the communication system includes a microphone-including arrangement to be carried by the rider and a manually-operable switch mounted upon the handlebars of the power sports equipment for controlling operating characteristics of the communication system as the hands of the rider remain positioned about the handlebars of the power sports equipment.

The improvement comprises a control unit mountable upon the power sports equipment and which is connectable to the manually-operable switch mountable upon the handlebars of the power sports equipment. Furthermore, the control unit and the microphone-including arrangement include means for wirelessly communicating with one another so that control of operating characteristics of the communication system can be had by way of the manually-operable switch mounted upon the handlebars of the power sports equipment without any need for wires connected between the microphone-including arrangement and the power sports equipment.

DETAILED DESCRIPTION OF THE ILLUSTRATED EMBODIMENTS

Figure 1:
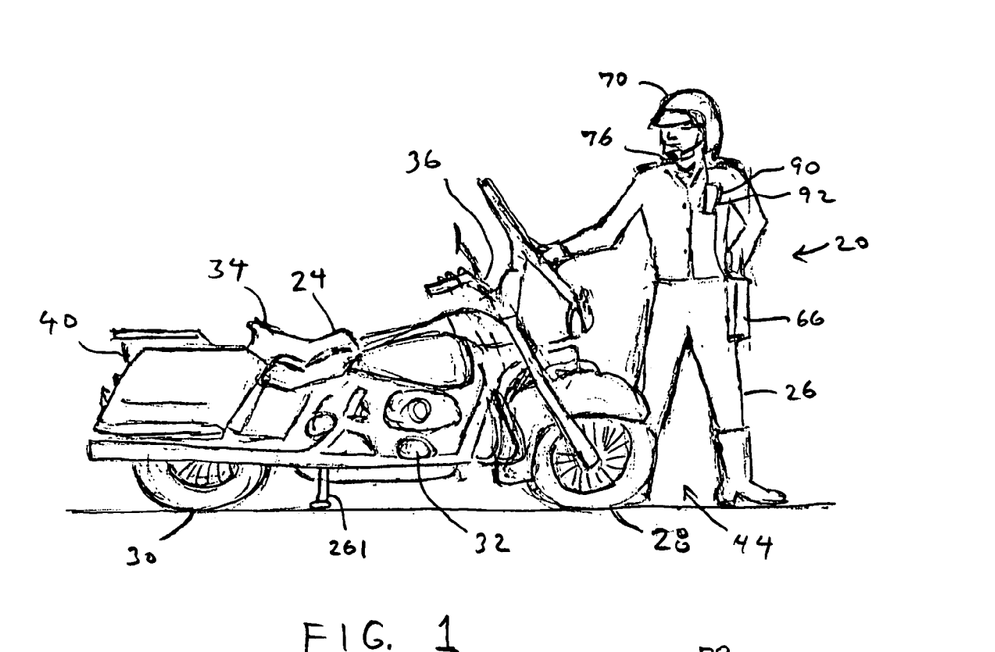
FIG. 1 is a side elevation view of a motorcycle-riding law enforcement officer, his motorcycle and various items of communication equipment within which features of the present invention are embodied.
Figure 2:
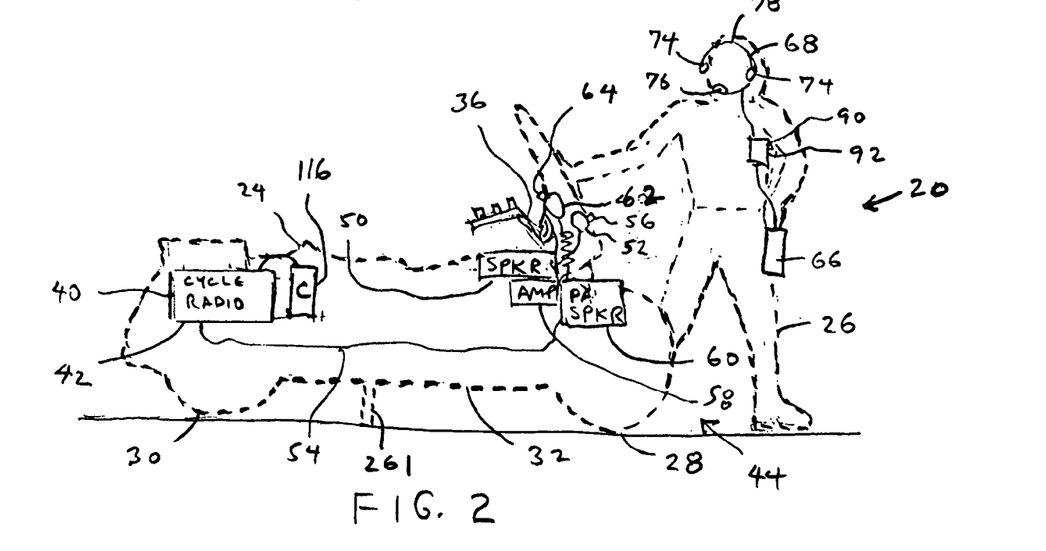
FIG. 2 is a view similar to that of FIG. 1 except that items of the FIG. 1 communication equipment carried by the officer and his motorcycle are more clearly identified against phantom-line outlines of the officer and his motorcycle.

Turning now to the drawings in greater detail and considering first FIGS. 1 and 2, there is illustrated a communication system, generally indicated 20, embodying features of the present invention and shown employed in an exemplary environment of intended use. More specifically, the environment of FIGS. 1 and 2 includes a motorcycle 24 and a motorcycle rider 26, such as a policeman, and the communication system 20 includes one set of components, described herein, which are attached to and carried by the motorcycle 24 and another set of components, described herein, which are attached to and carried by the rider 26.

Briefly, the motorcycle 24 includes a frame, front and rear wheels 28 and 30, respectively, an engine 32 supported between the front and rear wheels 28 and 30, a seat 34 for the rider 26, and a set of handlebars 36 adapted to be gripped by the hands of the rider 26 during operation of the motorcycle 24. As is the case with many motorcycles, there is mounted upon the handlebars 36 various hand-operated controls for controlling the operation (e.g. speed and braking) of the motorcycle 24 while the rider's hands remain gripped about the handlebars 36.

The motorcycle 24, as well as the rider 26, carries items, described herein, of communication equipment which cooperate with the communication system 20 during operation of the system 20. More particularly and as best shown in FIG. 2, items of such communication equipment carried by the depicted motorcycle 24 includes a two-way radio 40 and a public address (PA) system or equipment, generally indicated 44—each of which is well known in the art. The two-way radio 40 includes a body 42 which is supported upon the motorcycle frame adjacent the rear wheel 30, and the principle components of the PA equipment 44 (commonly incorporated within a combination Siren/PA amplifier system) are supported by the motorcycle frame adjacent the handlebars 36.

The operation and construction of the motorcycle-carried two-way radio 40 are well known in that its body 42 includes means for receiving wireless voice-carrying signals transmitted from a remote source, such as from a police station or from the radio equipment of another policeman, and also includes a speaker 50 mounted, for example, adjacent the motorcycle handlebars 36 for emitting audible sounds (e.g. voice messages) corresponding to the voice-carrying signals received by the radio 40. In other words, the radio speaker 50 enables messages received by the radio 40 to be heard by the rider 26. In addition, the radio 40 further includes a microphone 52 situated, for example, adjacent the handlebars 36 of the motorcycle 24 and which is connected to the body 42 of the radio 40 by means of a wire 54. Voice messages which originate from the rider 26 and are transmitted through the microphone 52 to the body 42 of the radio 40 are subsequently transmitted wirelessly from the radio body 42 to a remote site, such as to a police station or to another policeman.

The motorcycle-carried radio 40 is adapted to be manually switched between a talk mode during which voice messages spoken by the rider into the microphone 52 are broadcasted from the radio body 42 and a non-talk, or listen, mode during which the wireless voice-carrying signals which are received by the radio body 42 are conducted to the radio speaker 50 where they are emitted in the form of audible voice messages for the rider to hear. Normally, the radio 40 is in the non-talk, or listen, mode but its operating mode can be changed from the non-talk mode to a talk mode by depressing a push-to-talk (PTT) switch 56 mounted upon the side of the microphone 52. Therefore, by depressing the PTT switch 56, the radio 40 changes from its normal, non-talk mode to its talk mode enabling the rider 26 to wirelessly transmit voice messages which are spoken by the rider 26 into the radio microphone 52 from the radio body 42. Upon release of the PTT switch 56, the motorcycle-carried radio 40 reverts to its non-talk mode. As will be apparent herein, one embodiment of the communication system 20 of the present invention includes a microphone-including unit, described herein, which provides the rider 26 with the option of using either the radio microphone 52 or the microphone-including unit for transmitting rider-spoken messages to the body 42 of the motorcycle-carried radio 40 for broadcast therefrom.

For purposes which will be also apparent herein, the motorcycle-carried radio 40 also includes a number of access ports, such as an "accessory" port, into which a component of the system 20, described herein, can be plugged for purposes of providing alternatives (e.g. talk, listen, PTT signals) to the motorcycle-carried radio 40.

The public address (PA) equipment 44 carried by the motorcycle 24 includes a amplifier 58 and an associated loudspeaker 60 mounted, for example, adjacent the handlebars 36 and a microphone 62 which is wired to the amplifier unit 58. The PA equipment 44 can be activated through an appropriate switch 64 (i.e. a push-to-talk switch) mounted on the side of the microphone 62 and which is depressed by the rider 26 when the rider desires to transmit his voice over the PA loudspeaker 60. As will apparent herein, the communication system 20 described herein provides the rider 26 with the option of using either the PA microphone 62 or a microphone-including unit of the communication system 20 for transmitting his voice messages over the PA loudspeaker 60.

Figures 3, 4:
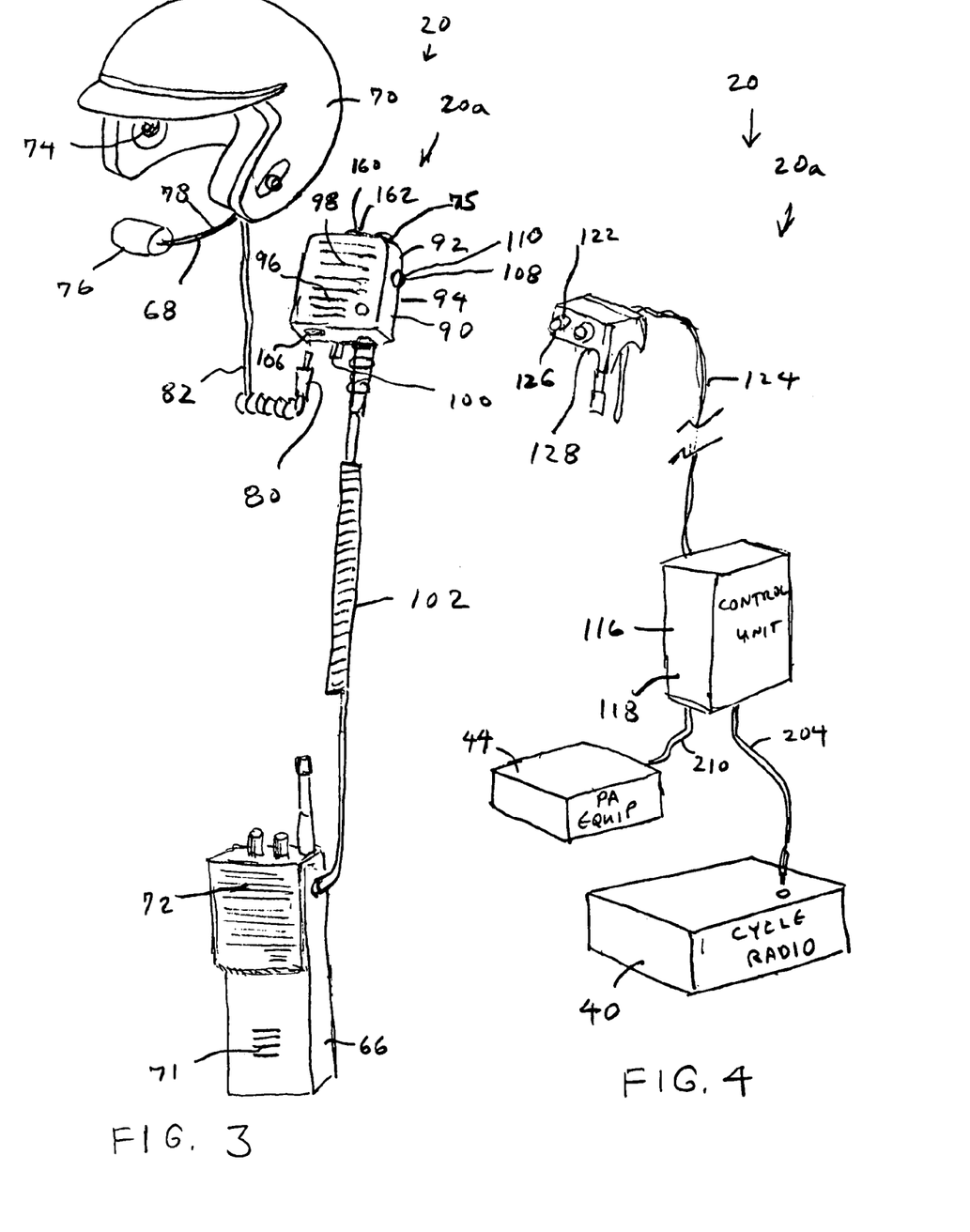
FIG. 3 is a perspective view which illustrates schematically various items of the communication equipment carried by the officer of FIG. 1.
FIG. 4 is a perspective view which illustrates schematically various items of the communication equipment mounted upon the motorcycle of FIG. 1.

With reference to FIGS. 2 and 3, the communication equipment carried by the rider 26 in the depicted example includes a portable radio 66 and a communications assembly 68 which is adapted to be mounted within a helmet 70 worn by the rider 26. The portable radio 66 is adapted to be carried upon the waistbelt of the rider 26, and its structure and operation are well known in the art. Briefly, the portable radio 66 is a self-contained unit which, if operating in a talk mode, can be used to wirelessly transmit voice messages which are spoken into an internal microphone 71 of the radio 66 by the rider 26 to a remote site. In the alternative and if operating in a non-talk, or listen, mode, the radio 66 is adapted to receive wireless voice-carrying signals which are transmitted from a remote site to the radio 66 and subsequently broadcast audible voice messages which correspond to those voice-carrying signals through an internal speaker 72 of the radio 66 for the rider 26 to hear. There exists manual mode-switching controls (e.g. a PTT switch) mounted upon the body of the radio 66 enabling a user to switch the radio 66 between its talk and non-talk modes, but as will be explained herein, when components of the communication system 20 have been connected to the radio 66 in a manner described herein, the operating modes of the radio 66 can be controlled by way of switches associated with those connected components. To accommodate the connection between selected components of the communication system 20 and the radio 66, the radio 66 is adapted to accept one end of a cable 102 leading from such components of the communication system 20.

With reference still to FIGS. 2 and 3, the helmet-mounted communications assembly 68 includes two (e.g. a left and a right) earphones 74 which are adapted to be positioned in registry with the ears of the rider 26 when the helmet 70 is worn and a microphone 76. A suitable harness 78 which is positioned within the helmet 70 supports the microphone 76 adjacent the mouth of the rider 26 when the helmet 70 is worn so that voice messages which are spoken by the rider 26 are picked up by the microphone 76. The earphones 74 and microphone 76 are operatively wired to a jack 80 by way of a cable 82 enabling the helmet-mounted communications assembly 68 to be connected to a component of the communication system 20 described herein. When the communications assembly 68 is in use (i.e. connected to the aforementioned component of the communication system 20), the earphones 74 permit the rider 26 to hear messages received by the either the motorcycle radio 40 or the portable radio 66, and the microphone 76 is adapted to transmit voice messages spoken by the rider 26 to either the motorcycle radio 40 or to the portable radio 66 for transmission of the voice-carrying signals therefrom or to the motorcycle-mounted PA equipment 44 for broadcast therefrom.

At least a portion of the operating power for the helmet-mounted communications assembly 68, as well as for a component (described herein) of the communication system 20, is withdrawn from the portable radio 66 through appropriate wiring connected therebetween. Accordingly and in order for the communications assembly 68 and the communication system to operate, the portable radio 66 must be switched ON. The remainder of the operating power for the helmet-mounted communications system 68 is withdrawn from a battery mounted internally of the aforesaid component (described herein) of the communications system 20.

As will be apparent herein, one embodiment of the communication system 20 is intended to be employed when the portable radio 66 is used to transmit voice-carrying signals to a remote source and to receive voice-carrying signals from a remote source, and another embodiment of the communication system 20 is intended to be employed when the motorcycle-carried radio 40 is used to transmit voice-carrying signals to a remote source and to receive voice-carrying signals from a remote source. Either embodiment, however, can be employed to transmit voice messages which originate from the rider 26 to the motorcycle-mounted PA equipment 44 for broadcast from the loudspeaker 60 thereof.

The aforesaid one embodiment, indicated 20a in FIGS. 3–5, of the communication system 20 will now be described as it is used in conjunction with the portable radio 66 carried by the rider 26.

Figure 5:
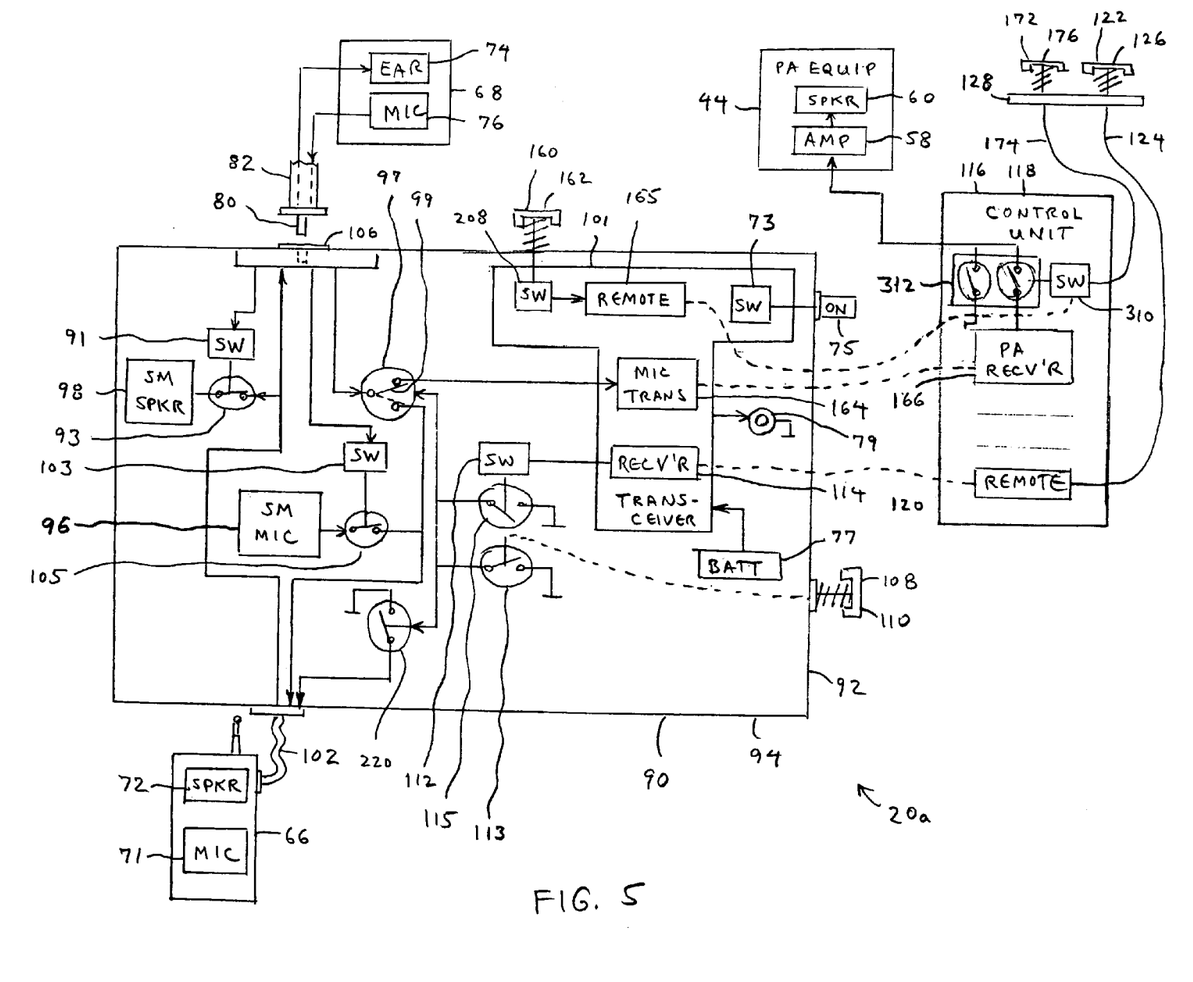
FIG. 5 schematically illustrates in block diagram form the operation of one embodiment of the FIG. 1 communication equipment when used to transmit voice messages of the officer over the portable two-way radio carried by the officer of FIG. 1 or over the PA system carried by the FIG. 1 motorcycle.

With reference to FIGS. 3 and 5, the communication system embodiment 20a includes a microphone-including unit 90 which is adapted to be carried by the rider 26 for emitting voice-carrying signals to the portable radio 66 for wireless transmission therefrom or to the motorcycle-mounted PA equipment 44. In the depicted systems of FIGS. 3 and 5, the microphone-including unit 90 is in the form of a combination speaker and microphone unit 92 having a body 94 (FIG. 5) within which is housed a microphone 96 and a speaker 98. Mounted upon the back of the body 94 of the unit 92 is a clip 100 (FIG. 3) or similar attachment means enabling the unit 92 to be clipped to the shirt of the rider 26 adjacent the rider's chest or shoulder area. The unit 92 is connectable to the portable radio 66 by way of a cable 102 and has a receptacle 106 for accepting the jack 80 associated with the helmet-mounted communications assembly 68. The cable 102 conducts operating power to the unit 92 from the portable radio 66 and conducts, when necessary, voice-carrying signals between the unit 92 and the radio 66.

The speaker and microphone unit 92 cooperates with the portable radio 66 in a manner which transfers preselected functions of the radio 66 to the chest or shoulder area of the rider 26. In other words, the unit 92 obviates any need for the rider 26 to remove the radio 66 from his waistbelt and thereafter hold the radio 66 adjacent his head to either speak into the radio microphone 71 for subsequent broadcast therefrom or to hear voice messages emitted from the radio speaker 72. To this end and as is known in the art, internal componentry within the portable radio 66 is capable of sensing the connection of the cable 102 to the radio 66 and thereby enables voice messages which are spoken into the microphone 96 of the unit 92 (or into the microphone 76 of the helmet-mounted communications assembly 68, as will be described herein), during the talk mode of the radio 66, to be conducted to the radio 66 in the form of voice-carrying signals where they are wirelessly transmitted therefrom to a remote site and further enables voice-carrying signals which are received by the radio 66 from a remote source, during the non-talk or listen mode of the radio 66, to be conducted to the unit 92 for subsequent transmission from a speaker, such as the unit speaker 98 (or into the earphones 74 of the helmet-mounted communications assembly 68, as will be described herein), in the form of audible voice messages which correspond to the voice-carrying signals received by the radio 66.

Furthermore, the speaker and microphone unit 92 includes a manually-operable PTT switch 108 which enables the rider to switch the radio 66 between its talk mode and its non-talk mode. To this end and with reference to FIGS. 3 and 5, the manually-operable switch 108 includes a depressible switch button 110 which is mounted on the side of the body 94 of the unit 92 and which is movable between extended and depressed conditions relative to the side of the unit 92 for controlling the operating mode of the portable radio 66. More particularly, the switch button 110 is spring-biased from a depressed condition to a normally-extended condition so that by depressing the button 110 on the side of the unit 92 from its extended condition to its depressed condition, the portable radio 66, as well as the unit 92, is switched by way of an internal (normally-open) switch mechanism 113 from a normal non-talk, or listen, mode to a talk mode. More specifically, the actuation of the switch 113 triggers a relay switch 220 and thereby activates the PTT input of the portable radio 66. Moreover, relay switch mechanism 97 is also triggered upon actuation of the switch 113 enabling voice-carrying signals which originate at the assembly microphone 76 to be conducted to the portable radio 66 for broadcast therefrom to a remote site. Therefore, it follows that the depression of the manual switch button 110 of the PTT switch 108 permits voice-carrying signals which originate at the unit microphone 96 (or the microphone 76 of the helmet-mounted communications assembly 68) to be conducted to the portable radio 66 for transmission therefrom to a remote site. It also follows that the radio 66 and unit 92 will remain in the talk mode as long as the button 110 remains depressed.

Conversely, upon release of the switch button 110 of the PTT switch 108, the button 110 is permitted to return (under the influence of an internal spring) to its extended condition so that the switch mechanism 113 returns to its normally-open condition and so that the radio 66 and unit 92 returns to the non-talk, or listen, mode.

With reference still to FIG. 5, the unit 92 includes componentry which senses the presence of the jack 80 of the helmet-mounted communications assembly 68 when the jack 80 has been plugged into the receptacle 106 of the unit 92 for overriding the functions of the microphone 96 and speaker 98 of the unit 92 and thereby transferring the corresponding functions to the microphone 76 and earphones 74 of the communications assembly 68. More specifically, upon connection of the jack 80 of the communications assembly 68 into the unit receptacle 106, the earphones 74 of the communication assembly 68 are provided with a conductor path through the unit 92 to the radio 66 and an internal switching unit 91 actuates a (normally closed) switching mechanism 93 so that the unit speaker 98 is disengaged from the conductor path leading to the radio 66. Consequently, voice-carrying signals which are conducted from the radio 66 by way of the cable 102 are carried to the earphones 74 where audible voice messages which correspond to the voice-carrying signals are emitted for the rider 26 to hear.

Furthermore and upon plugging the jack 80 into the unit receptacle 106, an internal switch 103 is adapted to switch an associated (normally-closed) switch mechanism 105 so that the unit microphone 96 is disconnected from the conductor path leading to the radio 66. Accordingly and once the jack 80 is plugged into the unit receptacle 106, only the voice messages which are spoken into the microphone 76 of the communications assembly 68 are transmitted, in the form of voice-carrying signals, to the radio 66 for transmission to a remote site.

The plugging of the jack 80 into the unit receptacle 106 serves to boot up an internal transceiver 101 mounted within the unit 92 by making a circuit between a battery 77 mounted internally of the unit 92 and the transceiver 101, and the transceiver 101 embodies several functional components of the communications system 20a as will be apparent herein. It follows that the transceiver 101 is powered up by simply plugging the jack 80 into the unit receptacle 106. However, in order for the rider 26 to shut off power to the transceiver 101 without disconnecting the jack 80 from the unit receptacle 106, there is provided a manually-operable ON/OFF switch 75 mounted on the side of the unit 92 and connected to an appropriate switch 73 mounted within the transceiver 101. To utilize the ON/OFF switch 75 for turning the transceiver 101 ON or OFF, the switch 75 must be depressed for two seconds to switch the transceiver 101 to an opposite mode. Accordingly, there is associated with the ON/OFF switch 75 an associated timing circuit (not shown) so that when the transceiver 101 is ON and the rider 26 desires to switch the transceiver OFF, he must depress and hold down the switch 75 for two seconds. At the end of the two seconds, the transceiver 101 is switched OFF. By comparison and when the transceiver 101 is OFF (while the jack 80 remains plugged into the unit receptacle 106), the rider 26 can switch the transceiver 101 ON by depressing and holding down the switch 75 for two seconds.

Associated with the transceiver 101 is a light-emitting diode (LED) 79 mounted upon one side of the unit 92 and which is adapted to be switched ON when transceiver 101 withdraws power from the battery 77. Accordingly, the LED 79 provides the rider 26 with a means for visually indicating when power to the transceiver 101 is switched ON.

As long as the helmet-mounted communications assembly 68 is operatively connected to the unit 92 by way of the jack 80, the manual control of the operating (e.g. talk and non-talk) modes of the radio 66 and unit 92 can continue to be had through the manually-operable PTT switch 108 of the unit 92. Accordingly, the push-to-talk functions of the PTT switch 108 of the unit 92 are not overridden when the jack 80 is plugged into the unit receptacle 106 so that when the rider 26 desires that his voice messages be conducted from the microphone 76 to the radio 66 for transmission therefrom, he must still depress and hold down the switch button 110 of the PTT switch 108 while speaking into the microphone 76. Upon release of the switch button 110, the button 110 returns to its extended position, and the radio 66 reverts to its non-talk mode during which the rider 26 can hear voice messages received by the portable radio 66 through his earphones 74.

It follows from the foregoing that as long as the helmet-mounted communications assembly 68 is disconnected from the speaker and microphone unit 92 (as may be the case if the rider 26 does not wear his helmet 70), the rider 26 can communicate through his portable radio 66 by way of the unit 92. In other words and with the communications assembly 68 disconnected from the unit receptacle 106, voice messages which are spoken by the rider must be picked up by the microphone 96 of the unit 92 for conductance to the radio 66, and audible voice messages intended to be heard by the rider 26 must be emitted from the speaker 98 of the unit 92. On the other hand, as long as the helmet-mounted communications assembly 68 is connected to the unit 92 by way of the unit receptacle 106, voice messages which are spoken by the rider 26 must be picked up by the microphone 76 of the communications assembly 68 for conductance to the radio 66, and audible voice messages intended to be heard by the rider 26 must be emitted from the earphones 74.

With reference still to FIG. 5, it is a feature of the embodiment 20a of the communications system that it includes a second switch 112 and an attending (normally-open) switch mechanism 115 for electronically switching the speaker and microphone unit 92 from its non-talk mode to the talk mode upon receipt of a wireless switching signal generated for this purpose. To this end and with reference to FIGS. 4 and 5, the communication system embodiment 20a includes a control unit 116 including a body 118 mounted adjacent the motorcycle-carried radio 40 and through which the wireless switching signal (for actuating the switch 112) is generated, and there is incorporated within the transceiver 101 and associated with the switch 112 a receiver 114 which is adapted to sense the wireless switching signal generated through the control unit 116 and actuate the switch 112.

For purposes of generating the wireless signal used to actuate the switch 112 (and thereby switch the position of the switch mechanism 115 to a closed condition), the control unit 116 includes a remote controller 120 mounted within the body 118 thereof, and a manually-operable PTT switch 122 is mounted upon the handlebars 36 (FIG. 1) of the motorcycle 24 and wired to the controller 120 by way of a wire 124. The PTT switch 122 includes a depressible switch button 126 which is housed within a bracket 128 (with which the switch 122 is attached to the handlebars 36) and is spring-biased from a depressed condition relative to the bracket 128 to an extended condition relative thereto. Furthermore, the bracket 128 is attachable to the handlebars 36 so that the rider 26 can actuate (i.e. depress) the switch button 126 with one of his hands (i.e. his thumb) while the rider 26 maintains his grip about the motorcycle handlebars 36 during motorcycle operation.

The construction of the embodiment 20a of the communication system can best be understood through a description of its operation and with reference to the block diagram of FIG. 5. Considering first the situation in which the rider 26 desires to hear to an audible message which has been received by the portable radio 66 from a remote source, has his hands gripped about the motorcycle handlebars 36 (while he may or may not be operating his motorcycle 24), is wearing his helmet 70 about his head with the helmet-mounted communications assembly 68 operatively connected to the speaker and microphone unit 92 by way of the jack 80, and the portable radio 66 is switched ON, the communication equipment is normally in its non-talk, or listen, mode so that the rider 26 can hear any such audible messages through the earphones 74 of the helmet-mounted communications assembly 68. In other words and because the portable radio 66 and unit 92 are normally in the non-talk mode, the radio 66 and unit 92 are in condition to conduct voice-carrying signals which are received by the radio 66 through the cables 102, 82 and the unit 92 to the earphones 74 where audible messages corresponding to the voice-carrying signals are emitted for the rider 26 to hear.

On the other hand, when the rider 26 (in this first set of circumstances) wishes to transmit one of his voice messages to a remote site by way of the radio 66 to a remote site, he must first depress the button 126 of the PTT switch 122 mounted upon the handlebars 36 and then speak into the microphone 76 of the helmet-mounted communications assembly 68. By depressing the PTT switch button 126, the remote controller 120 is manually actuated so that a switching signal is generated by the controller 120 and transmitted wirelessly from the control unit 116. The generated switching signal is received by the receiver 114 associated with the second switch 112 mounted within the speaker and control unit 92 so that the switch 112 switches the radio 66 and unit 92 to the talk mode. As long as the button 126 of the PTT switch 122 remains depressed by the rider 26 during this first set of circumstances, any voice message that he speaks into the microphone 76 of the helmet-mounted communications assembly 68 is conducted (in the form of voice-carrying signals) through the cables 82, 102 and unit 92 to the radio 66 where the voice-carrying signals are broadcast to a remote site.

In a second instance in which the communications assembly 68 is disconnected from the unit 92 (such as may be the case if the helmet 70 is removed from the head of the rider 26), the rider 24 can listen to audible messages which have been received by the portable radio 66 from a remote source through the speaker 98 of the speaker and microphone unit 92. Therefore and under these circumstances, unless the PTT switch 108 is depressed, the radio 66 and unit 92 are normally in the non-talk, or listen, mode so that the rider 26 can hear audible messages through the speaker 98 of the unit 92.

A second embodiment, indicated 20b in FIG. 6, of the communication system will now be described when used in conjunction with the radio 40 carried by the motorcycle 24.

Figure 6:
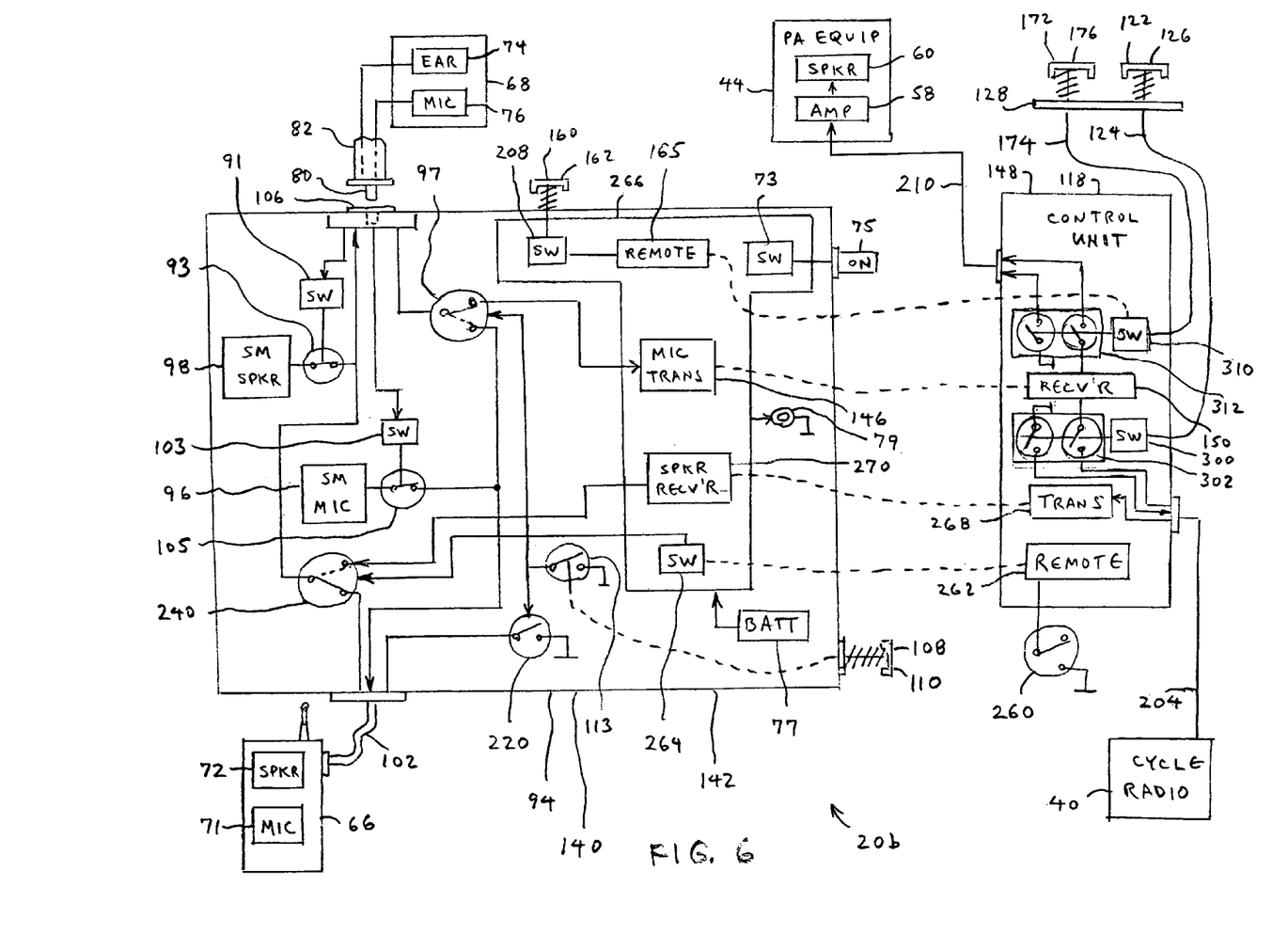
FIG. 6 schematically illustrates in block diagram form the operation of an alternative embodiment of the FIG. 1 communication equipment when used to transmit voice messages of the officer over either the portable two-way radio carried by the officer, a more powerful motorcycle-carried two-way radio or over the PA system carried by the FIG. 1 motorcycle.

With reference still to FIG. 6, the communication system embodiment 20b includes a microphone-including unit 140 which is adapted to be carried by the rider 26 for emitting, under circumstances described herein, voice-carrying signals to the motorcycle-carried radio 40 for wireless transmission therefrom to a remote site or to the motorcycle-mounted PA equipment 44. In the depicted FIG. 6 embodiment 20b, the microphone-including unit 140 is in the form of a combination speaker and microphone unit 142 having many of the components which have been described above in connection with the microphone-including unit 90 of FIGS. 1–3 and 5, and accordingly, such components bear the same reference numerals. Briefly, the combination speaker and microphone unit 142 has a body 94 within which is housed a microphone 96 and a speaker 98. Mounted upon the back of the body 94 of the unit 142 is a clip or similar attachment means enabling the unit 142 to be clipped to the shirt of the rider 26 adjacent the rider's chest or shoulder area. The unit 142 is connectable to the portable radio 66 by way of a cable 102 and has a receptacle 106 for accepting the jack 80 associated with the helmet-mounted communications assembly 68.

In many of the circumstances in which the FIG. 5 communication system embodiment 20a can be used, the FIG. 6 system embodiment 20b can be used as well, and its components operate in the manner in which the components of the FIG. 5 embodiment 20a operate. For example, in the instance in which the helmet-mounted communications assembly 68 is disconnected from the speaker and microphone unit 142 of FIG. 6 (as may be the case if the rider 26 does not wear his helmet), the rider 26 can still communicate through the portable radio 66 by way of the unit 142. In other words and with the communications assembly 68 disconnected from the unit receptacle 106, the voice messages which are spoken by the rider are picked up by the microphone 96 of the unit 142 for conductance to the portable radio 66 for transmission therefrom, and audible voice messages which are intended to be heard by the rider 26 are picked up (in the form of voice-carrying signals) by the portable radio 66 and conducted to the speaker 98 of the unit 92 where they are emitted therefrom in the form of audible messages which correspond to the conducted voice-carrying signals.

In connection with the foregoing and with reference still to FIG. 6, switches 93 and 105, as well as a relay switch 240 described herein, remain in a normally closed condition when the communications assembly 68 is disconnected from the unit receptacle 106 so that the unit speaker 98 and the unit microphone 96 remain connected to the portable radio 66 by way of appropriate conductor paths provided within the unit 142. In this configuration, portable radio reception will be audible over the unit speaker 98, and the voice messages which are spoken into the unit microphone 96 will be conducted, in the form of voice-carrying signals, to the portable radio 66 for broadcast therefrom to a remote site. It will be understood, however, that in order for the voice-carrying signals to be conducted to the portable radio 66 from the unit microphone 96, the PTT switch 108 mounted upon the side of the unit 140 must be depressed to thereby place the unit 140 and radio 66 in a talk mode. In this connection, the PTT switch 108 has a switch button 110 which is spring-biased from a depressed condition to a normally-extended condition so that by depressing the button 110 on the side of the unit 142 from its extended condition to its depressed condition, the unit 142 is switched by way of a normally-open switch mechanism 113 from a listen mode of operation to a talk mode of operation. In other words and upon depressing the button 110 of the PTT switch 108, the normally-opened switch 113 closes and relay switch 220 is triggered which, in turn, activates the PTT input to the portable radio 66. The relay switch 97 is also triggered by the depression of the PTT switch 108, but this does not effect system operation since there is no connection (by way of the unit receptacle 106) between the unit 142 and the microphone 76 of the helmet-mounted communication assembly 68.

After the officer dons his helmet, he then connects the jack 80 of the helmet-mounted communication assembly 68 to the unit receptacle 106. This action causes normally-closed switches 93 and 105 to open so that the unit speaker 98 and unit microphone 96 are thereby de-activated and so that conductor paths are provided between the microphone 76 and the earphones 74 of the communications assembly 68 and various components (e.g. a transceiver 266) of the unit 142. In other words, by plugging the jack 80 of the communications assembly 68 into the unit receptacle 106, the assembly microphone 76 is in condition to conduct voice messages which are spoken by the rider 26 to the radio 66, and audible voice messages which are received by the radio 66 and which intended to be heard by the rider 26 are conducted from the radio 66, through the unit 142 and to the earphones 74 where they are emitted in the form of audible voice messages. It follows that as long as these audible voice messages can be heard through the earphones 74, the unit 142 and radio 66 are in the non-talk, or listen, mode.

In order to transmit over the portable radio 66 through the helmet-mounted microphone 76, the rider 26 must depress the PTT switch 108 so that the switches 113 and 220 are triggered, thereby activating the PTT input to the radio 66 and changing the unit 142 and radio 66 to the talk mode. Relay switch 97 will also be triggered by this action (thereby changing the position of the internal switching mechanism 99 from the position illustrated in solid lines in FIG. 6 to the position illustrated in phantom lines in FIG. 6) so that the helmet-mounted microphone 76 is thereby connected to the microphone input of the portable radio 66 through an appropriate conductor path. It follows that the afore-described connection of the jack 80 to the unit receptacle 106 allows the rider 26 to communicate through the portable radio 66 by way of his helmet-mounted microphone 76.

When the rider 26 is away from his motorcycle 24, he is solely dependent upon his portable radio 66 for receiving messages (i.e. audio signals) which originate from a remote source (e.g. another law enforcement officer or a dispatcher). However, because the portable radio 66 is typically less-powerful than is the motorcycle-carried radio 40 —and thus more limited in its capacity to receive or transmit messages—it may be more desirable, in some instances, for the rider to utilize the more-powerful motorcycle-carried radio 40 to transmit or receive messages. Accordingly, the communication system embodiment 20b includes means, described herein, which changes the operation of the embodiment 20b from one operating mode in which the rider 26 communicates through the portable radio 66 to another operating mode in which the rider communicates through the motorcycle-carried radio 40.

To this end, the communication system embodiment 20b includes a sensor, or switch 260, associated with the motorcycle kickstand, indicated 261 in FIG. 1, for sensing a non-vertical condition of the kickstand 261 and which is connected to a remote controller 262 (FIG. 6) mounted within a control unit 148 of the embodiment 20b. As is commonly the case with kickstands, the kickstand 261 is adapted to support the motorcycle 26 in an upright position when the motorcycle 26 is not in operation and is pivotally connected to the body of the motorcycle 24 for movement between a substantially vertical condition for supporting the motorcycle 26 in an upright position and a non-vertical condition for storage of the kickstand 261.

Meanwhile, the control unit 148 includes a body 118 which is mounted upon the motorcycle 26 and is connectable to a "control input" port of the motorcycle-carried radio 40 by means of a wire 204 (FIGS. 4 and 6) for conducting voice-carrying signals from the radio 40 to the control unit 148 (when in the non-talk mode) and from the control unit body 118 to the radio 40 (when in the talk mode). In addition, the combination speaker and microphone unit 142 (FIG. 6) includes an electronic switch 264 (incorporated within the transceiver 266) for switching, upon receipt of a wireless signal from the remote controller 262, the relay switch 240 so that voice-carrying signals are routed thereto from the unit transceiver 266, rather from the portable radio 66. The relay switch 240, introduced earlier, is responsible for routing voice-carrying signals to the helmet-mounted earphones 74 from either the unit transceiver 266 or the portable radio 66, depending upon the position of the internal switching mechanism of the relay switch 240. Further still, the control unit 148 includes a transmitter 268 which is adapted to wirelessly transmit the voice-carrying signals received by the radio 40 from the control unit 148, and the unit 142 includes a receiver 270 (incorporated within the transceiver 266) for receiving the wirelessly-transmitted signals from the transmitter 268 for conductance of those signals to the earphones of the helmet-mounted communications assembly 68 through the relay switch 240.

By pivotally moving the motorcycle kickstand 261 from a substantially vertical condition (which would evidence that the motorcycle 24 has stopped and that the rider 26 has dismounted) to a non-vertical condition (which would evidence that the rider 26 is at or on the motorcycle 24), the kickstand switch 260 senses the non-vertical condition of the kickstand 261 and initiates, by way of the remote controller 262, a triggering of the unit switch 264 and, consequently the relay switch 240, so that the earphones 74 receive radio messages transmitted from the motorcycle-carried radio 40 by way of the control unit transmitter 268 and the unit receiver 270. It also follows that until the motorcycle kickstand 261 is returned to a substantially vertical condition from the non-vertical condition, messages which are received by the motorcycle-carried radio 40 (during this non-talk, or listen mode of operation) will continue to be transmitted (by way of the transmitter 268 of the control unit 148 and the unit receiver 270) for conductance to the earphones 74.

To enable the rider 26 to transmit, or broadcast, voice messages which he speaks into his helmet-mounted microphone 76 over the motorcycle radio 40 during a talk mode of operation, the combination speaker and microphone unit 142 includes a transmitter 146 (associated with the unit transceiver 266) to which voice-carrying signals are conducted from the microphone 76 for wireless transmission from the unit 142. In this connection and unless the PTT switch 108 mounted upon the side of the unit 142 is depressed (which would effect a switching of position of the internal switching mechanism 99 of the relay switch 97 from the depicted FIG. 6 solid-line position to the FIG. 6 phantom-line position by way of the switch 113), the relay switch 97 provides a conductor path for conductance of voice-carrying signals between the microphone 76 and the transmitter 146. Accordingly, voice-carrying signals which are conducted from the microphone 76 are normally routed to the transmitter 146 through the relay switch 97. Meanwhile and for purposes of receiving the voice-carrying signals which are wirelessly transmitted from the unit transmitter 146 for conductance to the radio 40, the control unit 148 includes a suitable receiver 150.

With reference still to FIG. 6, the control unit 148 includes a switch 300 and an associated (normally-open) switch mechanism 302 which is associated with the receiver 150 for routing, upon receipt of a switching signal generated for that purpose, the voice-carrying signals which are received by the receiver 150 from the unit transmitter 146 to the cycle radio 40 for transmission therefrom. The switch mechanism 302 is illustrated in the FIG. 6 embodiment 20b as including dual switch devices so that when the switch 300 is actuated, two functions are effected, i.e. the motorcycle-carried radio 40 is switched to a talk mode of operation and the voice-carrying signals which are received by the receiver 150 are conducted to the radio 40 for transmission therefrom. For purposes of actuating the switch 300, and consequently the switching mechanism 302, a manually-operable PTT switch 122 is mounted upon the handlebars 36 of the motorcycle 24 and is wired to the switch 300 of the control unit 148 by way of a wire 124. The PTT switch 122 includes a depressible switch button 126 which is supported within a bracket 128 (with which the switch 122 is attached to the handlebars 36) and is spring-biased from a depressed condition relative to the bracket 128 to an extended condition relative thereto. Furthermore, the bracket 128 is attachable to the handlebars 36 so that the rider 26 can actuate (i.e. depress) the switch button 126 with one of his hands (i.e. his thumb) while the rider 26 maintains his grip about the motorcycle handlebars 36 during operation of the motorcycle 24.

It follows that while the rider 26 is on or beside his motorcycle 24 with his helmet-mounted communication assembly 68 connected to the unit 142 by way of the jack 80 and unit receptacle 106 and he wishes to transmit a voice message through the motorcycle-carried radio 40 to a remote site, he must initially depress the button 126 of the PTT switch 122 mounted upon the handlebars 36 and then speak into the microphone 76 of the helmet-mounted communications assembly 68. By depressing the PTT switch button 126, the switch 300 is actuated so that the (normally-open) switch mechanism 302 closes so that the radio 40 is switched to a talk mode and so that voice-carrying signals which are received by the receiver 150 from the unit transmitter 146 are conducted to the motorcycle-carried radio 40 by way of the cable 204 for transmission from the radio 40 to a remote site.

It follows that as long as the button 126 of the PTT switch 122 remains depressed by the rider 26 during this set of circumstances (thereby keeping the embodiment 20 in a talk mode), any voice message that he speaks into the microphone 76 of the helmet-mounted communications assembly 68 is conducted (in the form of voice-carrying signals) from the microphone 76 and into the unit 142 from which they are wirelessly transmitted (by way of the transmitter 146) from the unit 142. These wirelessly-transmitted voice-carrying signals are picked up by the receiver 150 of the control unit 148 and then conducted to the radio 40 from which they are broadcast to a remote site.

As mentioned earlier, either of the embodiments 20a or 20b of the communication system can be employed for transmitting voice messages which originate from the rider 26 to the PA equipment 44 for broadcast from the loudspeaker 60 thereof. More specifically, either embodiment 20a or 20b can be utilized to wirelessly transmit voice-carrying signals from the microphone 76 of the helmet-mounted communications assembly 68 to the motorcycle-mounted PA equipment 44.

In this connection and with reference again to FIGS. 5 and 6, each of the combination speaker and microphone units 92 and 142 includes another PTT switch 160 mounted in the top of each of the units 92 and 142 and which is connected to an internal switch 208. The PTT switch 160 includes a depressible switch button 162 which is movable between extended and depressed conditions relative to the top of the unit 92 or 142 for actuating, when depressed, the internal switch 208.

The switch 208 is, in turn, associated with a remote controller 165 within the unit 92 or 142 so that upon actuation of the internal switch 208, the remote controller 165 wirelessly transmits a switching signal (for receipt by an appropriate switch mounted within the control unit 148). More specifically and in this connection, a switch 310 is mounted within the control unit 116 or 148 and an associated (normally-open) switch mechanism 312 is wired in-line between the receiver 166 (of the FIG. 5 embodiment 20a) or the receiver 150 (of the FIG. 6 embodiment 20b) and the PA equipment 44. The switch mechanism 312 of the each of the depicted embodiments 20a and 20b of FIGS. 5 and 6 includes dual switching devices so that when the switch 310 is actuated, two functions are effected, i.e. the PA equipment 44 is switched to a talk mode and the voice-carrying signals which are received by the receiver 166 of the FIG. 5 embodiment 20a or the receiver 150 of the FIG. 6 embodiment 20b are routed to the PA equipment 44 for broadcast from the loudspeaker 60 thereof.

Meanwhile, the switch 310 of the FIG. 5 embodiment 20a or the FIG. 6 embodiment 20b is adapted to sense the wireless switching signal generated by the remote controller 165 and switch the (normally-open) switching mechanism 312 to the closed condition to thereby route voice-carrying signals which are received by the receiver 166 or 150 of the control unit 116 or 148, respectively, from the transmitter 146 of the unit 140 to the amplifier unit 58 of the PA equipment 44 for broadcast over the PA loudspeaker 60 in the form of audible voice messages.

It follows therefore that the rider 26 can transmit voice messages spoken into the microphone 76 of his helmet-mounted communication assembly 68 over the PA equipment 44 by depressing the switch button 162 of the unit-mounted PTT switch 160 while his voice messages are being spoken into the microphone 76. Thus, the depression of the switch button 162 renders the operating mode of the embodiment 20a or 20b as a PA talk mode, while the release of the PTT switch button 162 returns the communication embodiment 20a or 20b to a non-PA talk mode.

To enable the rider 26 of the FIG. 5 embodiment 20a or the FIG. 6 embodiment 20b to utilize the PA equipment 44 while maintaining his grip upon the handlebars 36, another manually-operable PTT switch 172 is mounted upon the handlebars 36 of the motorcycle 24 (alongside the PTT switch 122) and wired to the internal switch 310 of the control unit 148 by way of a wire 174. The PTT switch 172 includes a depressible switch button 176 which is housed within the bracket 128 (with which the switches 122 and 176 are attached to the handlebars 36) and is spring-biased from a depressed condition relative to the bracket 128 to an extended condition relative thereto. With the switch button 176 of the PTT switch 172 mounted alongside the switch button 126 of the PTT switch 122, the rider 26 can actuate (i.e. depress) either of the switch buttons 126 or 176 with one of his hands (i.e. his thumb) while he maintains his grip about the motorcycle handlebars 36 during operation of the motorcycle 24.

Upon depression of the switch button 176 of the PTT switch 172, the internal switch 310 is manually actuated so that the (normally-open) switching mechanism 312 closes thereby routing voice-carrying signals which are received by the receiver 166 (of the FIG. 5 embodiment 20*a*) or by the receiver 150 (of the FIG. 6 embodiment 20*b*) from the unit transmitter 146 to the PA equipment 44 by way of the cable 210 for broadcast from the loudspeaker 60 thereof.

Therefore, to use the PA equipment 44 of either of the FIG. 5 embodiment 20*a* or the FIG. 6 embodiment 20*b* while the rider 26 maintains his grip about the motorcycle handlebars 36, the rider 26 can depress the switch button 176 of the PTT switch 172 while he speaks into the microphone 76 of his helmet-mounted assembly 68. Therefore, as long as the switch button 176 of the PTT switch 172 is depressed, the communication system embodiment 20*a* or 20*b* is in a PA talk mode so that voice messages which are spoken into the assembly microphone 76 are ultimately broadcast over the PA loudspeaker 60 in the form of audible voice messages.

It follows from the foregoing that a communication system 20 has been described for use by a rider 26 of power sports equipment (e.g. a motorcycle 24) having handlebars 36 about which the hands of the rider 26 are gripped during operation of the power sports equipment. Such a communication system 20 includes a microphone-including arrangement to be carried by the rider for emitting voice-carrying signals. For present purposes, the phrase "microphone-including arrangement" is intended to mean the arrangement of components which includes the functioning microphone carried by the rider 26. In the examples described above, the microphone-including arrangement can take the form of the speaker and microphone unit 92 or 142 (through which messages are spoken into the unit microphone 96) or the combination of a speaker and microphone 92 or 192 and the helmet-mounted communications assembly 68 which is connected to the unit 92 or 192 (through which messages are spoken into the microphone 76 of the communications assembly 68).

Furthermore, the communication system includes a control unit which is mountable upon the power sports equipment (e.g. the motorcycle 24), and the control unit and the microphone-including arrangement includes means for wirelessly communicating with one another so that control of the operating characteristics of the communication system (e.g. the talk versus the non-talk mode of operation) can be had by way of a manually-operable switch mounted upon the handlebars of the power sports equipment without any need for wires connected between the microphone-including arrangement and the control unit, or more specifically, the power sports equipment.

Because the communication system described herein does not require that any cable or wire be connected between the rider and the power sports equipment, the rider can, if desired, climb onto or off of his power sports equipment and move away from the power sports equipment without having to remember to connect or disconnect the radio or PA communication equipment being carried upon his person to appropriate hook-ups associated with the power sports equipment. Consequently, the communication system described herein eliminates the chance that the rider will walk away from his vehicle and be either jerked back toward the power sports equipment or become entangled within wires or cables which may otherwise join the rider to the power sports equipment.

It also follows that the communication system 20 is well-suited for use by law enforcement or rescue personnel who are expected to operate a radio or PA equipment as the personnel rides a motorcycle or other power sports equipment, such as an all-terrain vehicle (ATV) or a snowmobile. Accordingly, the principles of the present invention can be applied to any of a number of environments.

It will be understood that numerous modifications and substitutions can be had to the aforedescribed embodiments without departing from the spirit of the invention. For example, each component (i.e. each of speaker and microphone units 92 and 142, control units 116 and 148 and bracket-mounted PTT switches 122 and 172) of the aforedescribed embodiments 20*a* or 20*b* can all be equipped with or accompanied by an LED which is energized when the power to the component is switched ON. Such an LED would visually inform the rider 26 as to whether each component of the communication system embodiment 20*a* or 20*b* is prepared for operation. Accordingly, the aforedescribed embodiments 20*a* or 20*b* are intended for the purpose of illustration and not as limitation.

The invention claimed is:

1. In a communication system for use by a rider of power sports equipment having handlebars about which the hands of the rider are positioned during operation of the power sports equipment and wherein there is carried by the rider a portable two-way radio and there is incorporated within the power sports equipment at least one of a two-way radio and public address (PA) equipment to which voice-carrying signals can be routed for transmission or broadcast therefrom and wherein the communication system includes a microphone-including arrangement including a microphone to be carried by the rider and a manually-operable switch mounted upon the handlebars of the power sports equipment for controlling operating characteristics of the communication system as the hands of the rider remain positioned about the handlebars of the power sports equipment, the improvement comprising:

the microphone-including arrangement and the portable two-way radio being connectable to one another so that messages which are spoken by the rider into the microphone of the microphone-including arrangement can be conducted to the portable two-way radio for transmission therefrom;

a control unit mountable upon the power sports equipment and connectable to the manually-operable switch mountable upon the handlebars of the power sports equipment; and the control unit and the microphone-including arrangement including means for wirelessly communicating with one another so that control of operating characteristics of the communication system can be had by way of the manually-operable switch mounted upon the handlebars of the power sports equipment without any need for wires connected between the microphone-including arrangement and the power sports equipment;

the microphone-including arrangement including means for wirelessly relaying voice-carrying signals from the microphone-including arrangement;

the control unit includes means for capturing the voice-carrying signals relayed wirelessly from the microphone-including arrangement, and the capturing means is connectable to one of the two-way radio and the PA equipment incorporated within the power sports equipment for conductance thereto of the voice-carrying signals which are received by the capturing means; and the microphone-including arrangement including a multi-path switch for selectively routing voice-carrying signals which are emitted from the microphone-including arrangement to the portable two-way radio for transmission therefrom or wirelessly to the control unit for conductance of the voice-carrying signals to one of the two-way radio and the PA equipment incorporated within the power sports equipment;

the manually-operable switch mounted upon the handlebars is cooperable with the control unit to effect the condition of the multi-path switch so that actuation of the manually-operable switch selectively routes voice-carrying signals which are emitted from the microphone-including arrangement to the portable two-way radio for transmission therefrom or wirelessly to the control unit for conductance to one of the two-way radio and the PA equipment incorporated within the power sports equipment for transmission or broadcast therefrom.

2. The improvement as defined in claim 1 wherein the microphone-including arrangement is adapted to operate in a talk mode during which voice messages spoken by the rider are received by the microphone of the microphone-including arrangement and are relayed therefrom in the form of voice-carrying signals and a non-talk mode; and the control unit includes means for sending a wireless switching signal to the microphone-including arrangement for switching the operating mode of the microphone-including arrangement between the non-talk and talk modes upon actuation of the manually-operable switch mounted upon the handlebars.

3. The improvement as defined in claim 2 wherein there is incorporated within the power sports equipment a two-way radio and each of the portable two-way radio and the two-way radio incorporated within the power sports equipment is adapted to receive voice-carrying signals transmitted thereto from a remote source, and the microphone-including arrangement includes a speaker for emitting audible messages which correspond to voice-carrying signals routed to the microphone-including arrangement and cooperates with each of the portable two-way radio and the two-way radio incorporated within the power sports equipment so that during the non-talk mode of operation of the microphone-including arrangement, voice-carrying signals which are received by either the portable two-way radio or the two-way radio incorporated within the power sports equipment from a remote source are routed to the speaker of the microphone-including arrangement for the rider to hear and so that during the talk mode of operation of the microphone-including arrangement, voice-carrying signals which are produced by the microphone-including arrangement are routed to the portable two-way radio or the two-way radio incorporated within the power sports equipment for transmission therefrom.

4. The improvement as defined in claim 1 wherein there is incorporated within the power sports equipment both a two-way radio and public address (PA) equipment to which voice-carrying signals are desired to be conducted for transmission or broadcast therefrom;

the manually-operable switch is a first manually-operable switch and is connectable to the control unit so that actuation of the first manually-operable switch routes voice-carrying signals which are emitted from the microphone-including arrangement wirelessly to the capturing means of the control unit and then to the two-way radio incorporated within the power sports equipment for transmission therefrom to a remote site; and the improvement includes a second manually-operable switch mounted upon the handlebars of the power sports equipment and which is connectable to the control unit so that actuation of the second manually-operable switch routes voice-carrying signals which are emitted from the microphone-including arrangement wirelessly to the capturing means of the control unit and then to the PA equipment incorporated within the power sports equipment for broadcast therefrom.

5. The improvement as defined in claim 1 wherein there is incorporated within the power sports equipment a two-way radio for receiving voice-carrying signals which are transmitted thereto from a remote source;

the control unit is connectable to the two-way radio incorporated within the power sports equipment for receiving voice-carrying signals which are transmitted thereto from a remote source and includes means for wirelessly relaying the received voice-carrying signals from the control unit;

the portable two-way radio is adapted to receive voice-carrying signals which are transmitted thereto from a remote source for conductance to the microphone-including arrangement;

the microphone-including arrangement includes a speaker and means for capturing the voice-carrying signals relayed wirelessly from the control unit and for accepting voice-carrying signals conducted thereto from the portable two-way radio; and the improvement further comprises an electronic switch associated with the microphone-including arrangement for selectively routing to the speaker either the voice-carrying signals which are captured by the capturing means of the microphone-including unit or the voice-carrying signals which are accepted by the accepting means of the microphone-including unit so that the rider can hear through the speaker voice messages which correspond to the captured or the accepted voice-carrying signals;

the electronic switch being predisposed in a condition for routing to the speaker a predetermined one of the captured voice-carrying signals and the accepted voice-carrying signals so that until actuated, the electronic switch is maintained in its predisposed condition, and so that when the electronic switch is actuated, the condition of the switch is altered so that the other of the captured voice-carrying signals and the accepted voice-carrying signals are routed to the speaker, and the electronic switch is responsive to a wireless switching signal generated for the purpose of altering the condition of the electronic switch; and the control unit includes means for sending a wireless switching signal to the electronic switch of the microphone-including arrangement upon the occurrence of a predetermined event so that the condition of the electronic switch is thereby altered.

6. The improvement as defined in claim 5 wherein the power sports equipment includes a kickstand for supporting the power sports equipment when the power sports equipment is not in operation and is pivotally movable relative to the remainder of the power sports equipment between a substantially vertical condition for supporting the power sports equipment as aforesaid and a non-vertical condition for storage of the kickstand, and the improvement further includes a kickstand switch associated with the kickstand which is adapted to sense the existence of a substantially vertical condition of the kickstand and is connected to the wireless switching signal-sending means of the control unit for sending a wireless switching signal to the electronic switch of the microphone-including arrangement when the kickstand is arranged in its substantially non-vertical condition so that the condition of the electronic switch is thereby altered.

7. The improvement as defined in claim 6 wherein the electronic switch is in a predisposed condition so that, unless the electronic switch is actuated, the accepted voice-carrying signals conducted from the portable two-way radio are routed to the speaker and so that when actuated, the condition of the electronic switch is altered so the captured voice-carrying signals relayed from the control unit are routed to the speaker.

8. The improvement as defined in claim 1 wherein there is carried by the power sports equipment both a two-way radio to which voice-carrying signals relayed from the microphone-including arrangement can be delivered for transmission therefrom and public address (PA) equipment including a loudspeaker to which voice-carrying signals relayed from the microphone-including arrangement can be delivered for broadcast from the loudspeaker thereof;
   the capturing means of the control unit is connectable to the two-way radio;
   the manually-operable switch is a first switch and is connected to the control unit so that upon actuation of the first switch, the voice-carrying signals which are received by the capturing means of the control unit are conducted to the two-way radio for transmission therefrom;
   the capturing means of the control unit is connectable to the PA equipment; and
   the system further includes a second manually-operable switch being mountable upon the handlebars of the power sports equipment and connected to the control unit so that upon actuation of the second switch, the voice-carrying signals which are received by the capturing means of the control unit are conducted to the PA equipment for broadcast from the loudspeaker thereof.

9. The improvement as defined in claim 1 wherein the manually-operable switch includes a switch button which is supported for movement between an extended condition and a depressed condition and which is spring-biased from the depressed condition toward the extended condition so that the manually-operable switch is actuated upon movement of the switch button from the extended condition to the depressed condition.

10. The improvement as defined in claim 1 wherein each of the portable two-way radio and the one of the two-way radio and PA equipment incorporated within the power sports equipment is adapted to operate in a talk mode during which voice messages which are spoken by the rider and are received either by the portable two-way radio or the one of the two-way radio and PA equipment incorporated within the power sports equipment for transmission or broadcast therefrom and a non-talk mode during which any voice-carrying signals which are received by either the portable two-way radio or the two-way radio from a remote source is routed to the microphone-including arrangement and can be heard by the rider as voice messages which correspond to the voice-carrying signals received by a corresponding radio, and there is associated with each of the portable two-way radio and the one of the two-way radio and PA equipment an electronic switch which, unless actuated, maintains the corresponding portable two-way radio or the one of the two-way radio and PA equipment in a non-talk mode and which, when actuated, places the corresponding radio or PA equipment in a talk mode; and
   the manually-operable switch mounted upon the handlebars cooperates with the electronic switch so that actuation of the manually-operable switch effects the actuation of the electronic switch so that the corresponding radio or PA equipment is thereby placed in a talk mode.

11. The improvement as defined in claim 1 wherein there is incorporated within the power sports equipment a two-way radio and
   the multi-path switch is in a predisposed condition so that unless the multi-path switch is actuated, the voice-carrying signals which are emitted from the microphone-including arrangement are routed to the control unit for conductance to the two-way radio which is incorporated within the power sports equipment and so that when the multi-path switch is actuated, the voice-carrying signals which are emitted from the microphone-including arrangement are routed to the portable two-way radio for broadcast therefrom.

12. The improvement as defined in claim 1 wherein there is incorporated within the power sports equipment a two-way radio, and each of the portable two-way radio and the two-way radio of the power sports equipment is adapted to receive voice-carrying signals transmitted thereto from a remote source;
   the microphone-including arrangement includes a speaker for emitting audible messages which correspond to voice-carrying signals routed to the microphone-including arrangement and cooperates with the portable two-way radio so that voice-carrying signals which are received by the portable two-way radio from a remote source can be routed to the microphone-including arrangement so that audible messages which correspond to the received voice-carrying signals can be heard by the rider through the speaker thereof and cooperates with the two-way radio of the power sports equipment so that voice-carrying signals which are received by the two-way radio of the power sports equipment from a remote source can be routed to the microphone-including arrangement so that audible messages which correspond to the received voice-carrying signals can be heard by the rider through the speaker thereof;
   the microphone-including arrangement includes an electronic switch which is disposed along the electrical path of voice-carrying signals routed to the microphone-including unit from the portable two-way radio and the two-way radio of the power sports equipment and which is in a predisposed condition so that unless the electronic switch is actuated, audible messages which correspond to the voice-carrying signals which are routed to the microphone-including arrangement from the portable two-way radio can be heard by the rider through the speaker thereof and so that when the electronic switch is actuated, audible messages which correspond to the voice-carrying signals which are routed to the microphone-including arrangement from the two-way radio of the power sports equipment can be heard by the rider through the speaker thereof; and the microphone-including arrangement further includes a manually-operable switch which, unless actuated, permits the portable two-way radio to remain in a non-talk mode so that voice-carrying signals which are received by the portable two-way radio from a remote source continue to be routed to the microphone-including arrangement and which, when actuated, renders the portable two-way radio in a talk mode during which messages which are spoken by the rider into the microphone of the microphone-including arrangement are conducted to the portable two-way radio for transmission to a remote site.

13. In a communication system for use by a rider of power sports equipment having handlebars about which the hands of the rider are positioned during operation of the power sports equipment and public address (PA) equipment to which voice-carrying signals are desired to be conducted for broadcast therefrom and wherein there is carried by the rider a two-way portable radio and wherein the communication system includes a microphone-including arrangement to be carried by the rider and a manually-operable switch mounted upon the handlebars of the power sports equipment for controlling operating characteristics of the communication system as the hands of the rider remain positioned about the handlebars of the power sports equipment, the improvement comprising:
   a control unit mountable upon the power sports equipment and connectable to the manually-operable switch mountable upon the handlebars of the power sports equipment; and
   the control unit and the microphone-including arrangement including means for wirelessly communicating with one another so that control of operating characteristics of the communication system can be had by way of the manually-operable switch mounted upon the handlebars of the power sports equipment without any need for wires connected between the microphone-including arrangement and the power sports equipment;
   the microphone-including arrangement is adapted to operate in a talk mode during which messages spoken by the rider are received by the microphone of the microphone-including arrangement and are relayed therefrom in the form of voice-carrying signals and a non-talk mode;
   the microphone-including arrangement is connectable to the two-way portable radio so that the voice-carrying signals which are relayed from the microphone-including arrangement are conducted to the two-way portable radio for transmission therefrom to a remote site;
   the control unit includes means for capturing the voice-carrying signals relayed wirelessly from the microphone-including arrangement, and the capturing means is connectable to the PA equipment for conducting the voice-carrying signals which are captured by the capturing means of the control unit to the PA equipment; and
   the manually-operable switch mounted upon the handlebars is cooperable with the control unit so that by actuating the manually-operable switch, voice-carrying signals which are relayed from the microphone-including arrangement are captured by the capturing means of the control unit and are subsequently conducted from the capturing means to the PA equipment for broadcast therefrom.

14. The improvement as defined in claim 13 wherein the manually-operable switch includes a switch button which is supported for movement between an extended condition and a depressed condition and which is spring-biased from the depressed condition toward the extended condition so that the manually-operable switch is actuated upon movement of the switch button from the extended condition to the depressed condition.

15. In a communication system for use by a rider of power sports equipment wherein there is incorporated within the power sports equipment public address (PA) equipment to which voice-carrying signals are desired to be routed for broadcast therefrom and wherein the communication system includes a microphone-including arrangement including a microphone to be carried by the rider, the improvement comprising:
   the microphone-including arrangement including means for wirelessly relaying voice-carrying signals which correspond to messages spoken by the rider into the microphone of the microphone-including arrangement;
   a control unit mountable upon the power sports equipment and including means for capturing the voice-carrying signals relayed wirelessly from the microphone-including arrangement, and the capturing means is connectable to the PA equipment incorporated within the power sports equipment for conductance thereto of the voice-carrying signals which are captured by the capturing means;
   the control unit further including an internal switch which, when actuated, routes voice-carrying signals which are relayed from the microphone-including arrangement and captured by the capturing means of the control unit to the PA equipment for broadcast therefrom; and
   the microphone-including arrangement includes means for remotely actuating the internal switch of the control unit enabling the rider to broadcast messages spoken into the microphone-including arrangement over the PA equipment.

* * * * *